United States Patent [19]

Kimura et al.

[11] Patent Number: 4,574,655
[45] Date of Patent: Mar. 11, 1986

[54] WRIST MECHANISM FOR INDUSTRIAL ROBOT

[75] Inventors: Kaoru Kimura; Shunji Sato; Junichiro Ogawa, all of Kitakyushu; Mitsuyoshi Nakano, Munakata, all of Japan

[73] Assignee: Kabushiki Kaisha Yasakawa Denki Seisakusho, Kitakyushi, Japan

[21] Appl. No.: 630,952

[22] Filed: Jul. 16, 1984

[51] Int. Cl.⁴ ............................................. F16H 37/00
[52] U.S. Cl. ................................. 74/665 A; 74/640; 414/735; 901/15; 901/26; 901/29
[58] Field of Search ................... 414/735, 744 A, 680, 414/744 R; 901/14, 15, 23–29; 74/423, 479, 640, 665 A, 665 B, 665 C, 665 R, 665 E, 665 D; 294/86.4

[56] References Cited

U.S. PATENT DOCUMENTS

| | | | |
|---|---|---|---|
| 4,068,536 | 1/1978 | Stackhouse | 901/26 X |
| 4,365,928 | 12/1982 | Baily | 901/29 X |
| 4,499,790 | 2/1985 | Helms | 901/26 X |
| 4,507,046 | 3/1985 | Sugimoto et al. | 414/735 |

FOREIGN PATENT DOCUMENTS 2505239 11/1982 France ................................. 901/26

Primary Examiner—Donald W. Underwood
Attorney, Agent, or Firm—Lester Horwitz

[57] ABSTRACT

The present invention provides a wrist mechanism with three degrees of freedom for an industrial robot, which is compactly formed and to which a tool is mounted. The first degree of freedom is associated with a first input shaft for rotating a wrist portion at a low speed. The second and third degrees of freedom are associated with rotating the tool or tilting the wrist. In order to attain these motions, second and third input shafts concentrically arranged relative to the first input shaft are used for transmitting motion to, through bevel gears, speed reduction mechanisms each symmetrically disposed at right and left sides, and the outputs therefrom are used to drive the tool and wrist.

4 Claims, 3 Drawing Figures

WRIST MECHANISM FOR INDUSTRIAL ROBOT

BACKGROUND OF THE INVENTION

The present invention relates to a structure of a wrist having three degrees of freedom for use with an industrial robot.

A wrist coupled to the end of the arm of an industrial robot is required to have suitable motions for carrying out a desired job in three dimensional space. Thus, as shown in FIG. 1, an entire wrist B coupled to an arm A must be rotated in a direction shown by an arrow a, the angle of a tool C mounted on the wrist must be adjusted or tilted as shown by a reference character b, and the tool itself must be rotated as shown by a reference character c. In order to meet the above requirements, three drive shafts must be inserted into the interior of the arm supporting the wrist, so that the outer dimension and weight of the arm disadvantageously increase and the power for driving the arm increases as well.

SUMMARY OF THE INVENTION

It is an object of the invention to provide a mechanism which enables to impart three degrees of freedom to a wrist of an industrial robot, smoothly and with a simple arrangement.

According to the present invention, in an industrial robot in which a tool is mounted at the end of an arm through a wrist mechanism, the wrist mechanism for an industrial robot comprises: a first drive shaft rotating at a reduced speed for rotating the whole wrist; second and third drive shafts for tilting and rotating a tool supporting shaft of a wrist portion; said first, second, and third drive shafts being mounted within said arm and the axes thereof being aligned in the same shaft axis line; a speed reduction shaft whose axis is perpendicular to said shaft axis line; and two sets of differential speed reduction devices mounted about said speed reduction shaft; said speed reduction shaft and differential speed reduction devices being mounted within a wrist cover; wherein said second drive shaft is coupled to one of the input shafts of said differential speed reduction devices, said third drive shaft is coupled to the other of the input shafts of said differential speed reduction devices, and the output shafts are coupled to tilting and tool rotation shafts, respectively, or the output shafts are both coupled to a tool mounting shaft through gears.

DETAILED DESCRIPTION OF THE INVENTION

Figure 1:
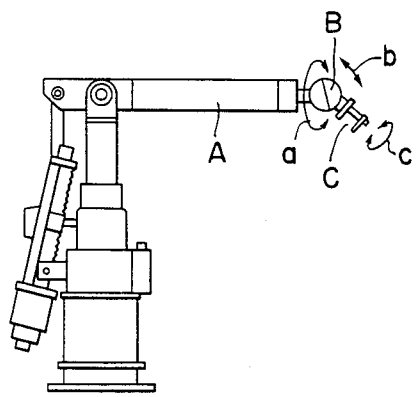
FIG. 1 is a side view showing a whole robot of an embodiment according to the present invention.
Figure 2:
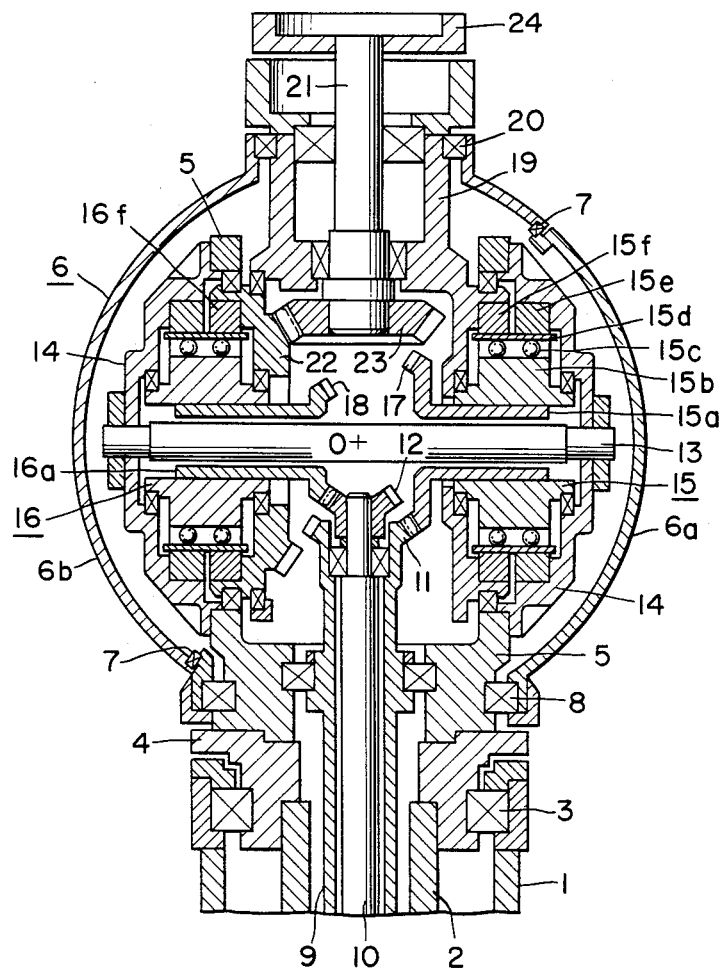
FIG. 2 is a side cross-sectional view of a first embodiment according to the present invention.

According to an embodiment of the present invention, two sets of differential speed reduction devices are provided within a wrist and arranged symmetrically of and perpendicularly to the axis of an arm. The adjustment of the angle of the wrist and the rotation of a tool are carried out through the differential speed reduction devices, so that input axes for the devices can be made slender and hence the arm can be smaller while improving the accuracy of a mechanism according to the invention. Reference is now made to FIG. 2 for illustrating the embodiment.

Reference number 1 designates an arm, and reference number 2 designates a first input shaft for rotating the whole of a wrist, the first input shaft 2 being coupled to a wrist seat 4 supported by a bearing 3 mounted on the end of the arm 1. Reference number 5 designates a frame integral with the wrist seat 4. Reference number 6 designates a wrist cover having a spherical shape to be divided into two semispherical covers 6a and 6b along a line oblique to the axis of the arm 1. The divided covers 6a and 6b may be rotated along a division plane through a bearing 7, the cover 6a being mounted at the frame 5 through a bearing 8. Reference number 9 designates a second input shaft passing through the interior of the first input shaft 2 and extending to the interior of the wrist cover 6. Reference number 10 designates a third input shaft passing through the interior of the second input shaft, and reference numbers 11 and 12 designate respective bevel gears coupled to the second and third input shafts. Reference number 13 designates a speed reduction shaft supported by brackets 14, 14 mounted on the frame 5, and arranged within the wrist cover perpendicularly to the shaft axis of the arm. Reference number 15, 16 designate differential speed reduction devices each mounted opposite ends of the speed reduction shaft 13.

The differential speed reduction device 15 comprises an input shaft 15a, a drive wheel 15b, a ball bearing 15c, a flexible ring 15d, a fixed wheel 15e, and an output shaft 15f. The input shaft 15a is rotatably mounted on the speed reduction shaft 13 and has a bevel gear 17 meshing with the bevel gear 11. The drive wheel 15b of an elliptical shape is fixedly connected to the input shaft 15a. The flexible ring 15d has a plurality of spline teeth on the outer periphery thereof, and is slidably mounted on the outer periphery of the drive wheel 15b through the ball bearing 15c. The fixed wheel 15e fixed to the bracket 14 and the output shaft 15f rotatably supported by the bracket 14, are each provided with spline teeth meshing with the spline teeth of the flexible ring 15d and having a number of teeth slightly different from that of the flexible ring 15d. In operation, when the input shaft 15a and hence the drive wheel 15b integral therewith is rotated, the longer diameter side portions of the drive wheel 15b push the flexible ring 15d against the fixed wheel 15e and also against the output shaft 15f to thereby mesh both spline teeth with each other. The meshing portions are moved sequentially along the spline teeth while the flexible ring 15d is driven to rotate. Therefore, the flexible ring 15d is rotated at a lower speed reduced in proportion to the difference of the number of spline teeth from that of the fixed wheel 15e, and the output shaft 15f meshing with the flexible ring 15d is rotated at a lower speed reduced in proportion to the difference of the number of spline teeth therebetween.

The differential speed reduction device 16 is constructed in the same way as that of the above mentioned differential speed reduction device 15, in which an input shaft 16a is provided with a bevel gear 18 which meshes with the third input shaft 10.

Reference number 19 designates a tilting shaft mounted on the wrist cover 6b through a bearing 20. The tilting shaft 19 is aligned so as for the axis thereof to pass the intersection point 0 between the axes of the arm 1 and the speed reduction shaft 13, and is coupled to the output shaft 15f of the differential speed reduction device 15. Reference number 21 designates a tool rotation shaft disposed concentrically and interiorly of the tilting shaft 19 and coupled to the output shaft 16f of the differential speed reduction device 16 through bevel gears 22 and 23. Reference number 24 designates a flange mounted on the tool rotation shaft 21 for mounting a tool.

In effect, the first input shaft 2 driven at a reduced speed by a drive section and passing through the interior of the arm 1, rotates the wrist seat 4, while the second and third input shafts 9 and 10 are disposed within the arm 1 operatively at a high speed. The second input shaft 9 causes the differential speed reduction device 15 to operate via the bevel gears 11 and 17, and in turn causes the tilting shaft 19 to move about the speed reduction shaft 13. At this time, since the wrist cover 6 is divided obliquely relative to the axis of the arm, and the tilting shaft 19 is arranged at one side of the wrist cover 6b, so the tilting shaft 19 causes the cover 6b to turn around through the bearing 7 in the same direction as that of the tilting shaft 19, and also causes the cover 6a to turn around through the bearing 8 by a component force along the direction of the speed reduction shaft. Thus, the tilting shaft 19 tilts at a low speed while retaining a perpendicular relation to the speed reduction shaft.

Further, with the third input shaft 10 driven at a high speed, the differential speed reduction device 16 causes the bevel gear 22 to rotate at a low speed through the bevel gears 12 and 18. The bevel gear 23 meshing with the bevel gear 22 causes, the tool rotation shaft 21 and hence the flange 24 for mounting a tool, to be driven into rotation at a low speed.

As seen from the above description of the embodiment, the rotation and tilt of the wrist and the rotation of the flange mounting a tool, are accomplished through respective each input shaft passing through the interior of the arm. And the speed reduction devices for carrying out the tilt of the wrist and the rotation of the tool are mounted around the speed reduction shaft within the wrist. Therefore, the input shafts passing through the interior of the arm can be coupled at the wrist portion while rotating at a high speed. Thus, transmission torque for the input shafts may be small, and the diameter of the input shafts can be made smaller and hence the arm can be made slender. In addition, since the number of mechanical elements for tilting the wrist and rotating the tool in a transmission system at a low speed is relatively small, an error originated from a backlash or bending is remarkedly small. Therefore, the operation accuracy is improved and the manufacture and adjustment can be easily accomplished. Furthermore, since the shaft axes of the input shafts, tilting shaft, and tool rotation shaft intersect at the axis of the speed reduction shaft, there are some advantages that it is easy to calculate the locus of motion of a tool, and it is easy to operate the mechanism. By employing a differential speed reduction device as a speed reduction device, the weight of the device is decreased, and moreover the robot as a whole can be effectively miniaturized and lightweighted. By dividing the wrist cover, it is possible to prevent a dust from entering into the wrist without damaging the wrist operation.

Figure 3:
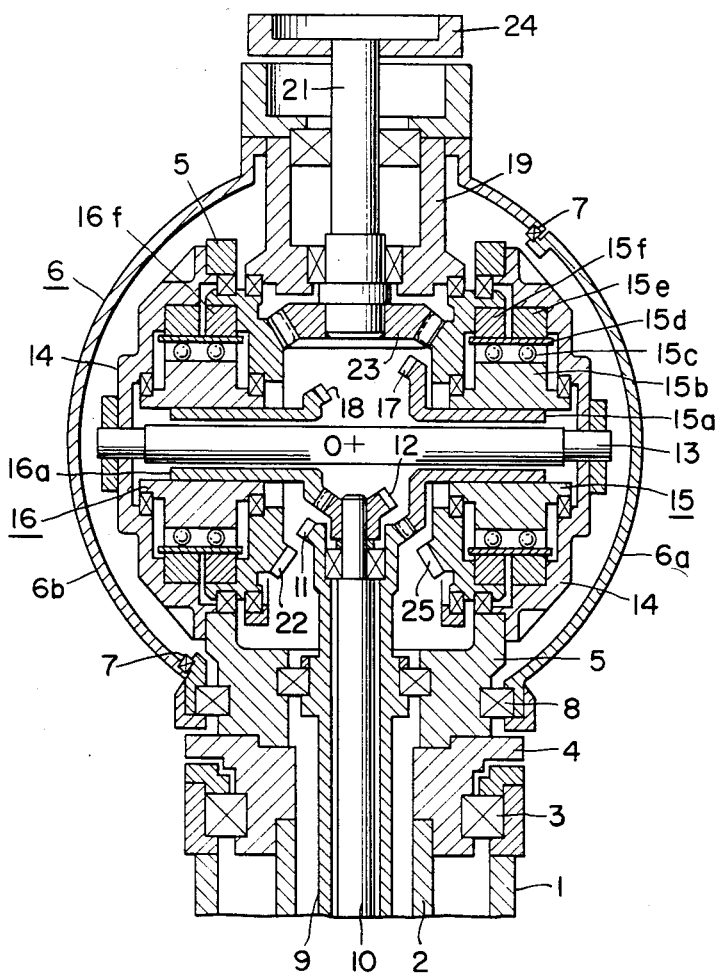
FIG. 3 is a side cross-sectional view of a second embodiment according to the present invention.

According to another embodiment of the present invention, a speed reduction shaft is mounted within a wrist, the axis of the shaft being perpendicular to the axis of the arm. Two sets of differential speed reduction devices are symmetrically disposed on the speed reduction shaft. Drive shafts for the angle adjustment of a wrist and for the rotation of a tool are passed through the interior of the arm rotating at a high speed. Thus, the drive shafts can be made small and hence the arm can be minituarized while improving the operation accuracy. For illustrating the second embodiment reference is made to FIG. 3, wherein the identical reference number has been used for identifying the same or corresponding elements as of FIG. 2.

A cover 6 of a sphere shape is constructed so as to be divided into two semi-spheres along a line oblique to the axis of an arm 1. A divided cover 6a is supported on a frame 5 through a bearing 8, while a cover 6b is engaged with a bearing 7 so as to be rotatable along a division plane.

Reference number 25 is a bevel gear fixedly connected to an output shaft 15f of a differential speed reduction device 15 and meshed with a bevel gear 18 of a tool supporting shaft 21.

A first drive shaft 2 is driven by a not-shown driver at a reduced speed, and passes through the interior of the arm 1 to rotate a wrist seat 4. However, second and third drive shafts 9 and 10 are disposed within the arm 1, the drive shafts rotating at a high speed.

It is assumed here that speed reduction ratios for bevel gears 11 and 17 and for bevel gears 12 and 18 are set equal, and that speed reduction ratios for differential speed reduction devices 15 and 16 are also set equal. In this case, when the second and third drive shafts 9 and 10 are initiated into rotation with an equal speed, then bevel gears 25 and 22 rotates at an equal low speed. Therefore, if the drive shafts 9 and 10 are driven such that the bevel gears 25 and 22 each cause a bevel gear 23 to turn in opposite direction, then the bevel gear 23 does not rotate and the tool supporting shaft 21 is turned about a speed reduction shaft 13 in the direction of rotation of the bevel gears 25 and 22. The cover 6b is turned about on a bearing 7 by a component force along the turning direction of the bevel gears 25 and 23, and the cover 6a is turned about on a bearing 8 by a component force perpendicular to the speed reduction shaft. Thus, the tool supporting shaft 21 is tilted at a low speed while retaining it in a direction perpendicular to the speed reduction shaft 13.

If the second and third drive shafts 9 and 10 are driven in a difference rotational direction, Then the bevel gears 25 and 22 are respectively driven in such a direction as the bevel gear 23 is driven in the same direction by both gears 25 and 22. Thus, the tool supporting shaft 21 rotates. At this time, if the speeds of the bevel gears 25 and 22 are different from each other, then the tool supporting shaft 21 tilts while rotating.

As seen from the above description of the second embodiment, the speed reduction shaft is mounted within the wrist, the axis of the shaft being perpendicular to that of the arm. The two sets of differential speed reduction devices are provided about the speed reduction shaft. The first drive shaft for rotating the whole wrist is accommodated within the arm as a low speed rotation shaft. The second and third drive shafts for tilting and rotating the tool supporting shaft pass through the interior of the arm as high speed rotation shafts, the speeds thereof being reduced by the differential speed reduction devices within the wrist. Therefore, a transmission torque for each of the second and third drive shafts can be small, and the arm for accommodating the drive shafts can be made slender. Further, the number of mechanical elements in a transmission system to the tool supporting shaft under operation of a low speed is small, and errors resulting from a backlash or bending is remarkedly decreased. Thus, it is possible to improve the operation accuracy and to make the manufacture and adjustment to be readily carried out. Moreover, since the axes of the drive shafts and tool supporting shaft intersect at the axis of the speed reduction shaft, the calculation for a locus of motion of a tool can be readily accomplished and the handling of the robot can be made easily. By incorporating a differential speed reduction device, it is possible to obtain a large speed reduction ratio with a light weight. Thus, the weight of the speed reduction device can be decreased which effectively make it possible for the whole robot to be miniturized and light-weighted. Further, since the bevel gear of the tool supporting shaft has two portions meshing with other bevel gears, it is possible to stabilize the operation.

What is claimed is:

1. In an industrial robot in which a tool is mounted on the end of an arm through a wrist mechanism, said wrist mechanism for an industrial robot comprising:

a first input shaft rotating at a reduced speed for rotating the whole wrist;

a second input shaft for tilting the wrist portion;

a third input shaft for rotating said tool; said first, second, and third input shafts being mounted within said arm and the axes thereof being aligned in the same shaft axis line;

a speed reduction shaft whose axis is perpendicular to said same shaft axis line;

differential speed reduction devices mounted about opposite ends of said speed reduction shaft respectively; and a tilting shaft for a wrist and a tool rotation shaft, the axes of both shafts disposed concentrically with each other passing through an intersection point between the axes of said input shafts and said speed reduction shaft; said speed reduction shaft, differential speed reduction devices, tilting shaft, and tool rotation shaft being mounted within a wrist cover;

wherein said second input shaft and tilting shaft are coupled to one of said differential speed reduction devices and said third input shaft and tool rotation shaft are coupled to the other of said differential speed reduction devices; said wrist cover is divided obliquely and is formed to have a spherical shape and to be rotatable along a division plane; and one of the divided wrist covers is mounted rotatably on a wrist seat and the other of the divided wrist covers has said tilting shaft and tool rotation shaft mounted thereon.

2. A wrist mechanism for an industrial robot as set forth in claim 1, in which said differential speed reduction devices each comprises a drive wheel of an elliptical shape coupled to an input shaft; a flexible ring slidable along the outer periphery of said drive wheel and having a plurality of spline teeth; and a fixed wheel and an output wheel, surrounding said flexible ring and having a plurality of spline teeth at the inner peripheries thereof, said plurality of spline teeth meshing with said spline teeth of said flexible ring and having the number of spline teeth slightly different from that of the flexible ring.

3. In an industrial robot in which a tool is mounted at the end of an arm through a wrist mechanism, said wrist mechanism for an industrial robot comprising:

a first drive shaft rotating at a reduced speed for rotating the whole wrist;

second and third drive shafts for tilting and rotating a tool supporting shaft of a wrist portion; said first, second, and third drive shafts being mounted within said arm and the axes thereof being aligned in the same shaft axis line;

a speed reduction shaft whose axis is perpendicular to said shaft axis line; and two sets of differential speed reduction devices mounted about said speed reduction shaft; said speed reduction shaft and differential speed reduction devices being mounted within a wrist cover;

wherein said differential speed reduction devices each comprise an input shaft and an output shaft and one of the input shafts of said differential speed reduction devices is coupled to said second drive shaft and the other of the input shafts of said differential speed reduction devices is coupled to said third drive shaft, and the output shafts thereof are coupled through gears to a tool tilting shaft and a tool rotating shaft respectively; said wrist cover is divided obliquely and is formed to have a sphere shape and to be rotatable along a division plane; and one of the divided wrist covers is mounted rotatably on a wrist seat and the other of the divided wrist covers has said tool supporting shaft mounted thereon.

4. A wrist mechanism for an industrial robot as set forth in claim 3, in which said differential speed reduction devices each comprises a drive wheel of an elliptical shape coupled to an input shaft; a flexible ring slidable along the outer periphery of said drive wheel and having a plurality of spline teeth; and a fixed wheel and an output wheel, surrounding said flexible ring and having a plurality of spline teeth at the inner peripheries thereof, said plurality of spline teeth meshing with said spline teeth of said flexible ring and having the number of spline teeth slightly different from that of the flexible ring.

* * * * *

UNITED STATES PATENT AND TRADEMARK OFFICE
CERTIFICATE OF CORRECTION

PATENT NO. : 4,574,655
DATED : March 11, 1986
INVENTOR(S) : Kaoru Kimura, Shunji Sato, Junichiro Ogawa It is certified that error appears in the above-identified patent and that said Letters Patent is hereby corrected as shown below:

```
                Title page:

Assignee Information [73]

Please delete "Yasakawa" and replace therefor --Yaskawa--.
```

Signed and Sealed this

Seventh Day of October, 1986

[SEAL]

*Attest:*

DONALD J. QUIGG

*Attesting Officer*      *Commissioner of Patents and Trademarks*